(12) United States Patent
Sridhara et al.

(10) Patent No.: US 9,229,092 B2
(45) Date of Patent: Jan. 5, 2016

(54) ADAPTIVE PASSIVE SCANNING AND/OR ACTIVE PROBING TECHNIQUES FOR MOBILE DEVICE POSITIONING

(71) Applicant: QUALCOMM Incorporated, San Diego, CA (US)

(72) Inventors: Vinay Sridhara, Santa Clara, CA (US); Saumitra Mohan Das, Santa Clara, CA (US); Ayman Fawzy Naguib, Cupertino, CA (US); Ravi Palanki, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 64 days.

(21) Appl. No.: 14/327,430

(22) Filed: Jul. 9, 2014

(65) Prior Publication Data
US 2014/0323161 A1      Oct. 30, 2014

Related U.S. Application Data

(63) Continuation of application No. 13/571,340, filed on Aug. 9, 2012, now Pat. No. 8,805,423.

(60) Provisional application No. 61/661,760, filed on Jun. 19, 2012.

(51) Int. Cl.
*G01S 5/02*    (2010.01)
*H04W 64/00*   (2009.01)
*G01S 5/14*    (2006.01)
*G01S 13/87*   (2006.01)

(52) U.S. Cl.
CPC ................ *G01S 5/0289* (2013.01); *G01S 5/14* (2013.01); *G01S 13/876* (2013.01); *H04W 64/00* (2013.01)

(58) Field of Classification Search
CPC ....... G01S 13/876; G01S 5/0289; G01S 5/14; H04W 64/00
See application file for complete search history.

(56) References Cited

U.S. PATENT DOCUMENTS

| | | |
|---|---|---|
| 6,282,427 B1 | 8/2001 | Larsson et al. |
| 8,041,319 B2 | 10/2011 | He et al. |
| 8,185,129 B2 | 5/2012 | Alizadeh-Shabdiz |
| 8,706,140 B2 | 4/2014 | Alizadeh-Shabdiz |
| 8,805,423 B2 | 8/2014 | Sridhara et al. |

(Continued)

FOREIGN PATENT DOCUMENTS

WO     WO-2008006077 A2     1/2008

OTHER PUBLICATIONS

International Search Report and Written Opinion—PCT/US2013/045287—ISA/EPO—Sep. 18, 2013.

*Primary Examiner* — Kashif Siddiqui
(74) *Attorney, Agent, or Firm* — Berkeley Law & Technology Group, LLP

(57) ABSTRACT

Various methods, apparatuses and/or articles of manufacture are provided which may be implemented to support mobile device positioning through the use of adaptive passive scanning and/or adaptive active probing techniques. For example, a mobile device may acquire signals from wireless transceivers, identify wireless transceivers based, at least in part, on the acquired signal(s), determine a received signal strength measurement for each of the wireless transceivers based, at least in part, on the acquired signal(s), and determine a transmission power of a probe signal to be transmitted to at least one of the wireless transceivers based, at least in part, on at least one of the received signal strength measurements.

30 Claims, 4 Drawing Sheets

(56) References Cited

U.S. PATENT DOCUMENTS

| | | | |
|---|---|---|---|
| 2004/0137905 A1* | 7/2004 | Jeong | H04W 48/16 455/450 |
| 2005/0003865 A1* | 1/2005 | Lastinger | H01Q 3/2605 455/562.1 |
| 2005/0229255 A1* | 10/2005 | Gula | H04L 63/1433 726/23 |
| 2006/0071790 A1 | 4/2006 | Duron et al. | |
| 2008/0008121 A1* | 1/2008 | Alizadeh-Shabdiz | G01S 5/02 370/328 |
| 2008/0182609 A1 | 7/2008 | Somasundaram et al. | |
| 2009/0103503 A1 | 4/2009 | Chhabra | |
| 2010/0118830 A1 | 5/2010 | Stephenson et al. | |
| 2010/0195595 A1* | 8/2010 | Iwata | H04W 48/16 370/329 |
| 2010/0201520 A1 | 8/2010 | Stern et al. | |
| 2010/0232401 A1 | 9/2010 | Hirsch | |
| 2013/0337847 A1 | 12/2013 | Sridhara et al. | |

\* cited by examiner

ADAPTIVE PASSIVE SCANNING AND/OR ACTIVE PROBING TECHNIQUES FOR MOBILE DEVICE POSITIONING

CROSS-REFERENCE TO RELATED APPLICATIONS

This application is a continuation of U.S. Non-Provisional application Ser. No. 13/571,340, filed Aug. 9, 2012, and entitled "ADAPTIVE PASSIVE SCANNING AND/OR ACTIVE PROBING TECHNIQUES FOR MOBILE DEVICE POSITIONING," which claims the benefit of U.S. Provisional Application Ser. No. 61/661,760, filed Jun. 19, 2012, and entitled, "ADAPTIVE PASSIVE SCANNING AND/OR ACTIVE PROBING TECHNIQUES FOR MOBILE DEVICE POSITIONING", all of which are assigned to the assignee hereof and all of which are incorporated herein by reference.

BACKGROUND

1. Field

The subject matter disclosed herein relates to electronic devices, and more particularly to methods, apparatuses and articles of manufacture for adaptive passive scanning and/or adaptive active probing techniques to support mobile device positioning.

2. Information

Mobile devices, such as mobile phones, notebook, computers, etc., typically have the ability to estimate location and/or position with a high degree of precision using any one of several technologies such as, for example, satellite positioning systems (e.g., GPS and the like), advanced forward-link trilateration (AFLT), just to name a few examples of signal-based positioning systems and/or corresponding signal-based positioning signals. Using high precision location information, applications for a mobile device may provide a user with various services, such as, for example, vehicle/pedestrian navigation, location-based searching, just to name a couple of examples. Here, high precision signal-based location information (e.g., obtained from GPS and/or other signal-based positioning systems) may be processed according to a global coordinate system (e.g., latitude and longitude or earth-centered xyz coordinates). While such use of signal-based location information referenced to a global coordinate system may be useful in providing some services (e.g., outdoor vehicle navigation), such signal-based location information referenced to a global coordinate system may be impractical for other types of services such as indoor pedestrian navigation.

In certain indoor environments, such as office buildings, shopping malls, airports, stadiums, etc., certain example signal-based positioning techniques may make use of various terrestrial-based wireless signal transmitting devices, e.g., wireless network service access transceivers, cellular network base stations, special-purpose beacon transmitters, etc., that transmit wireless signals which may be acquired by the mobile device and used for positioning purposes. For example, a mobile device may receive a signal-based positioning signal from a transmitter and based thereon determine a pseudorange between the transmitter and receiver. Hence, for example, positioning may be provided based on trilateration and/or other known signal-based positioning techniques.

In some implementations, an indoor navigation system may provide a digital electronic map to mobile devices as they enter a particular indoor area. Such an electronic map may show indoor features such as doors, hallways, entry ways, walls, etc., points of interest such as bathrooms, pay phones, room names, stores, etc. Such an electronic map may be stored at a server to be accessible by a mobile device through selection of a URL, for example. By obtaining and rendering all or part of an electronic map via a display mechanism, a mobile device may, for example, overlay a current location of the mobile device (and user) over the displayed map to provide the user with additional context.

In certain instances, in addition to an electronic map, an indoor navigation system may selectively provide assistance information to mobile devices to facilitate and/or enable various location based services. Such assistance information may include, for example, information to facilitate measurements of ranges to wireless service access transceivers at known fixed locations. In one implementation, For example, a "radio heatmap" or "probability heatmap" indicating and/or otherwise modeling expected RSSI and/or round-trip delay times at particular locations associated with service access transceivers may enable a mobile device to associate acquired signal measurements with one of the particular locations in an indoor environment. Here, for example, grid points may be laid over locations in an indoor environment at a uniform spacing (e.g., 0.5 meter separation of neighboring grid points), or possibly with non-uniform spacing. Thus, radio heatmap and/or other corresponding probability functions/models may be made available from a computing device (such as a server) for each grid point covering an indoor environment.

SUMMARY

In accordance with certain aspects, a method may be provided which comprises, with a mobile device: acquiring signals from a plurality of wireless transceivers; identifying each of the plurality of wireless transceivers based, at least in part, on one or more of the acquired signals; determining a received signal strength measurement for each of the plurality of wireless transceivers based, at least in part, on one or more of the acquired signals; and determining a transmission power of a probe signal to be transmitted to at least one of the plurality of wireless transceivers based, at least in part, on at least one of the received signal strength measurements.

In accordance with certain other aspects, an apparatus may be provided for use in a mobile device. Such an apparatus may, for example, comprise: means for acquiring signals from a plurality of wireless transceivers; means for identifying each of the plurality of wireless transceivers based, at least in part, on one or more of the acquired signals; means for determining a received signal strength measurement for each of the plurality of wireless transceivers based, at least in part, on one or more of the acquired signals; and means for determining a transmission power of a probe signal to be transmitted to at least one of the plurality of wireless transceivers based, at least in part, on at least one of the received signal strength measurements.

In accordance with still other aspects, a mobile device may be provided which comprises a processing unit to: identify each of a plurality of wireless transceivers based, at least in part, on one or more signals acquired from the plurality of wireless transceivers; determine a received signal strength measurement for each of the plurality of wireless transceivers based, at least in part, on one or more of the signals acquired from the plurality of wireless transceivers; and determine a transmission power of a probe signal to be transmitted to at least one of the plurality of wireless transceivers based, at least in part, on at least one of the received signal strength measurements.

In accordance with still further aspects, an article of manufacture may be provided for use by mobile device. For example, such an article of manufacture may comprise a non-transitory computer readable medium having computer implementable instructions stored therein that are executable by a processing unit in the mobile device to: initiate acquisition of signals from a plurality of wireless transceivers; identify each of the plurality of wireless transceivers based, at least in part, on one or more of the acquired signals; determine a received signal strength measurement for each of the plurality of wireless transceivers based, at least in part, on one or more of the acquired signals; determine a transmission power of a probe signal to be transmitted to at least one of the plurality of wireless transceivers based, at least in part, on at least one of the received signal strength measurements.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Figure 1:
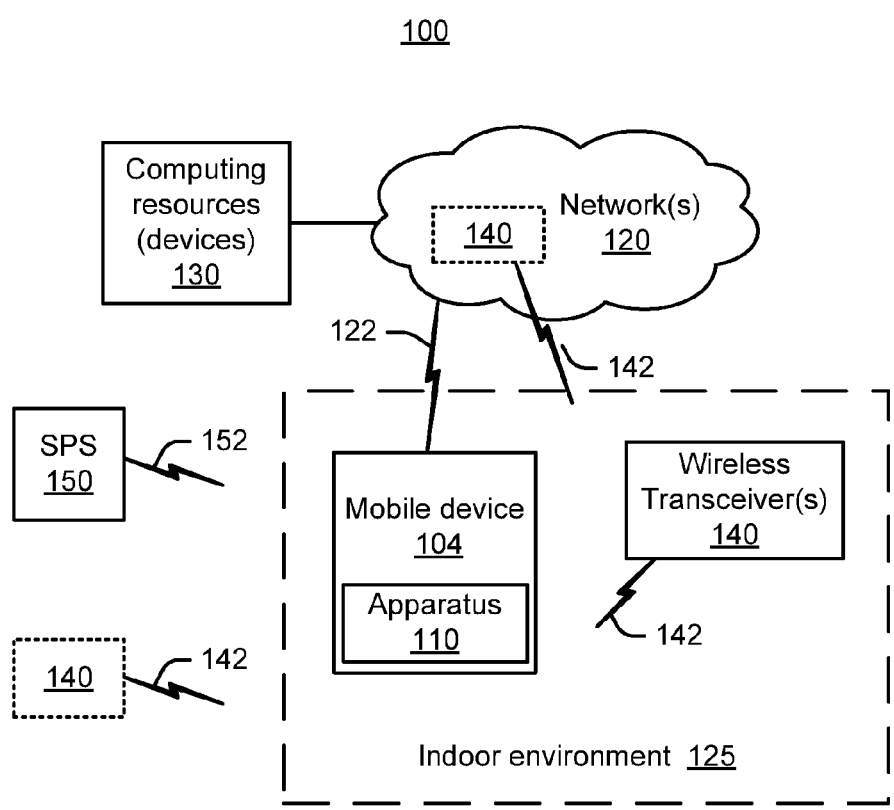
FIG. 1 is a schematic block diagram illustrating an example environment that includes representative electronic devices that may perform and/or otherwise support certain adaptive passive scanning and/or adaptive active probing techniques to support mobile device positioning, in accordance with an example implementation.

Certain mobile device positioning techniques are based, at least in part, on wireless signals transmitted between a mobile device and one or more other devices (e.g., one or more wireless transceivers). Such mobile device positioning techniques may be used to determine a location of the mobile device relative to some coordinate system, map, graph, etc., determine a range from the mobile device to another device and/or object, determine one or more parameters associated with movement of the mobile device, and/or support navigation or other location based service(s) that may be provided, at least in part, through the mobile device, just to name a few examples. In certain instances, it may be beneficial to select a subset of available wireless transceivers for use in such a mobile device positioning techniques since there may be a plethora of such wireless transceivers available in certain environments. Additionally, it may be beneficial to perform mobile device positioning quickly and/or efficiently, e.g., to improve a user experience, prolong battery life, etc. Accordingly, various example passive scanning techniques are described herein which may be used to select a subset of wireless transceivers. Further, in certain instances, a passive scanning technique may affect a transmit power setting or the like, which may be used in a subsequently conducted active probing technique. For example, a transmit power of the mobile device may be affected in some manner based, at least in part, on one or more received signal strength measurements for wireless signals acquired by the mobile device during a passive scan. Thus, in certain instances a transmit power of the mobile device may reduced from a maximum or nominal setting, which may reduce power consumption. In other instances, a transmit power of the mobile device may be increased from a nominal or previous setting, which may improve efficiency by increasing a likelihood that wireless signals subsequently transmitted by the mobile device may be acquired by the intended wireless transceivers. Hence, such passive scanning techniques may, for example, be referred to as "adaptive passive scanning" techniques.

With this in mind, various example implementations are described and illustrated herein by which certain adaptive passive scanning and active probing techniques may be realized to support mobile device positioning. As described herein certain passive scanning operations may be conducted by a mobile device to adapt a transmit power to a current environment surrounding the mobile device. As described herein certain active probing operations may be conducted based on such an adaptively determined transmit power.

Further, as described herein certain active probing operations may be conducted by a mobile device to limit corresponding probe signal transmissions to a selected subset of wireless transceivers within the current environment. Accordingly, in certain instances, such adaptive techniques, alone and/or combined with other techniques, may allow a mobile device to determine (e.g., estimate) its location in a manner which may reduce an amount of electrical power consumed, reduce an amount of time required to determine such a location, reduce a number of wireless transmissions, lower processing resource usage, wireless transmitter device selection processes, and/or the like or some combination thereof.

As described in greater detail by way of several example implementations, various techniques are provided for use with a mobile device in calculating an estimated location of the mobile device based on wireless signals acquired from one or more wireless transceivers (e.g., wireless service access transceivers, repeater devices, a location Beacon devices, etc.).

For example, in certain implementations, a mobile device may receive wireless signals from a plurality of wireless transceivers as part of a passive scanning operation in which the mobile device may further identify each of the plurality of wireless transceivers based, at least in part, on information (e.g., a unique identifier, location coordinates, etc.) that may be encoded in one or more of the acquired signals. The mobile device may also associate a received signal strength measurement with individual wireless transceivers. A mobile device may determine and/or otherwise affect a transmission power of a probe signal that may be later transmitted by the mobile device to at least one of the wireless transceivers based, at least in part, on at least one of the received signal strength measurements.

In certain further example implementations, a mobile device may direct probe signals for transmission to a selected subset of wireless transceivers, e.g. as part of a subsequent active probing operation. Here, for example, mobile device may determine a transmission power for use in transmitting such probe signals based, at least in part, on a lowest received signal strength measurement for acquired wireless signals from among the selected subset of wireless transceivers. As described in greater detail herein, in certain example implementations, one or more wireless transceivers may be included in or possibly excluded from a subset of wireless transceivers based on certain other factors and/or considerations.

In certain example implementations, as part of an active probing operation, a mobile device may use its communication interface to transmit, at a first time, a particular probe signal to a particular wireless transceiver that is in the subset of wireless transceivers. At a second time that is subsequent to the first time, the mobile device may receive a response to the particular probe signal from the particular wireless transceiver. The mobile device may, for example, compute a range to the particular wireless transceiver based, at least in part, on the period of time between first time and the second time. In certain example implementations, mobile device may further compute its estimated location based, at least in part, on one or more computing ranges to one or more wireless transceivers having known locations. Here, for example, in certain implementations, a range to a wireless transceiver may be based on a round trip time determined based, at least in part, on the first time and the second time, e.g., minus an expected processing time associated with a wireless transceiver.

In certain example implementations, to possibly improve accuracy in positioning, in selecting a subset of wireless transceivers to receive probe signals, a mobile device may select certain available wireless transceivers in a manner that may increase the diversity of angular directions from the mobile device to the wireless transceivers, and which may improve accuracy in positioning, e.g., based on trilateration, etc. Thus, in certain implementations if two wireless transceivers may fall along a single line (angle) from an approximate location the mobile device, or have angles from the approximate location the mobile device that are determined to be too close together (e.g., based on a threshold value), then it may be useful to select one, but not both, of the wireless transmitters for inclusion in a subset of wireless transmitters if possible. Thus, in certain implementations, a mobile device may select between two available wireless transceivers for inclusion or exclusion from a subset based, at least in part, on an angular separation between the two wireless transceivers from a vantage point of an approximate location of the mobile device. In certain example implementations, an angular threshold value may be considered which may be based, at least in part, on a dilution of precision (DOP) threshold value relating to the positioning technique being performed or otherwise supported by the mobile device. For example, an angular threshold value may be based, at least in part, on a threshold number of wireless transceivers to be included within a subset of wireless transceivers, and in certain implementations such a threshold number of wireless transceivers may be based, at least in part, on a DOP threshold value.

With this introduction mind, attention is drawn to FIG. 1, which is a schematic block diagram illustrating an example environment 100 that includes representative electronic devices that may perform and/or otherwise support certain adaptive passive scanning and/or adaptive active probing techniques to support mobile device positioning, in accordance with an example implementation.

Example environment 100 comprises a mobile device 104 having an apparatus 110 capable of performing certain adaptive passive scanning and/or adaptive active probing techniques in accordance with certain example implementations.

As used herein a "mobile device" may represent any electronic device that may be moved about either directly or indirectly by a user within an indoor environment and which may communicate with one or more other devices via one or more wired and/or wireless communication links. Some examples include a cell phone, a smart phone, a computer (e.g., a personal computer such as a laptop computer, tablet computer, a wearable computer, etc.), a navigation aid, a tracking device, a digital book reader, a gaming device, music and/or video player device, a camera, a machine, a robot, etc.

As illustrated in FIG. 1, at certain times mobile device 104 may be located within an indoor environment 125. The indoor environment 125 may, for example, represent one or more natural and/or man-made structures forming a full or partial enclosure. In certain implementations, such an indoor environment 125 may interfere with certain wireless positioning signals, e.g., such as those transmitted from a satellite positioning systems.

As illustrated however, while located within indoor environment 125 mobile device 104 may, for example, receive one or more wireless signals from one or more terrestrial-based wireless transceivers 140 over one or more wireless communication links 142. For example, mobile device 104 may receive one or more wireless signals from one or more wireless transceivers 140 as part of a passive scanning operation, and/or as part of an active probing operation. Likewise, mobile device 104 may, for example, transmit one or more wireless signals to one or more wireless transceivers 140 over one or more wireless communication links 142. For example, mobile device 104 may transmit one or more wireless signals to one or more wireless transceivers 140 as part of an active probing operation.

As illustrated, wireless transceivers 140 may be provisioned within an indoor environment 125, or outside of indoor environment 125, or within one or more network(s) 120, and configured to transmit and receive one or more wireless signals over one or more wireless communication links 142. Here, for example, such wireless signals may be used by mobile device 104 for positioning and/or navigation purposes.

As used herein, a "wireless transceiver" may represent any electronic device capable of transmitting and acquiring (e.g., receiving and understanding) one or more wireless signals in one or more wireless communication links. Wireless signals transmitted by a wireless transmitter may be acquired by the mobile device for use in positioning. By way of example, in certain implementations a wireless transceiver 140 may comprise a service access transceiver (e.g., an IEEE Standard 802.11 access point device and/or other like electronic device that may be part of a wireless local area network and/or other like communication capability). Such a service access transceiver and/or other like electronic device may, for example, provide additional connectivity to one or more other wired and/or wireless networks. Such a service access transceiver and/or other like electronic device may, for example, provide direct and/or indirect connectivity (e.g., via one or more networks, etc.) to one or more other computing resources (devices) 130. Thus, for example, in certain implementations a wireless transceiver 140 may provide mobile device 104 with access to additional communication and/or computing resources. However, in certain other implementations, one or more wireless transceivers 140 may be provisioned to provide limited support to a mobile device, e.g., as part of a positioning and/or navigation capability. Here, for example, a wireless transceiver 140 may take the form of a dedicated positioning resource, and/or the like as part of a location based service within an indoor environment, etc. Thus, a mobile device may be limited to simply transmitting to and acquiring wireless signals from such a dedicated positioning resource, for use in positioning/navigation. Regardless of its form, a wireless transceiver 140 may be uniquely identified and as such identifiable based, at least in part, on one or more wireless signals transmitted by the wireless transceiver. For example, a wireless signal transmitted by a wireless transceiver may be indicative of a unique identifier, e.g., a MAC address, etc. Further, wireless transceiver 140 may be arranged to transmit wireless signals from, and receive wireless signals at, a known location. In certain example implementations, a known location of a wireless transceiver 140 may be determined based, at least in part, on one or more wireless signals transmitted by the wireless transceiver. For example, in certain instances a wireless transceiver 140 may identify all or part of its location in a wireless signal. Here, for example, a wireless signal may comprise one or more coordinates and/or the like that is indicative of a location of the transmitting device's antenna(s). In another example, a wireless signal may comprise additional information (e.g., unique identifier, MAC address, etc.) that may be used to determine a known location of a wireless transceiver. Here, for example, one or more coordinates and/or the like that is indicative of a location of the transmitting device's antenna(s) may be determined via a database, lookup table, radio heatmap, probability heatmap, etc., based, at least in part, on unique identifier for the wireless transceiver. In certain example implementations, such a database, lookup table, etc., may be provisioned in the mobile device, e.g., as part of or in addition to an electronic map, etc. In certain example implementations, such a database, lookup table, radio heatmap, probability heatmap, etc., may be provisioned in one or more other devices external to the mobile device, which may be contacted (e.g., via a communication interface) to perform or otherwise support a determination process that associates the additional information acquired from a wireless transceiver with a known location of a wireless transceiver.

As illustrated, one or more satellite positioning system systems (SPS) 150 may be provided to transmit one or more wireless positioning signals in the form of one or more SPS signals 152 that may, at times, be acquired by mobile device and used for positioning and/or navigation purposes.

Network(s) 120 may comprise one or more communication systems and/or data networks having various interconnected devices supporting communication between computing device 102 and one or more other resources (devices) 130. As mentioned, network(s) 120 may further support communication between mobile device 104 and one or more computing resources (devices) 130. For example, communication between mobile device 104 and one or more computing resources (devices) 130 may allow for certain data and/or instructions to be exchanged there between. In certain implementations, computing resources (devices) 130 may also be used in similar fashion by one or more wireless transceivers 140 and/or other like devices within networks 120.

Computing resources (devices) 130 may represent one or more computing platforms from which mobile device 104 may obtain certain data files and/or instructions, and/or to which mobile device 104 may provide certain data files and/ or instructions. For example, in certain instances, all or part of an electronic map, a connectivity map, a routability graph, certain positioning and/or navigation assistance data, and/or the like may be obtained by mobile device 104 from one or more computing resources (devices) 130. For example, in certain instances, all or part of a set of instructions for use in apparatus 110 may be obtained from one or more computing resources (devices) 130.

As mentioned, SPS 150 which may transmit one or more SPS signals 152 to mobile device 104. SPS 150 may, for example, represent one or more global navigation satellite system (GNSS), one or more regional navigation satellite systems, and/or the like or some combination thereof. Additionally, one or more terrestrial-based positioning systems may be provided as represented by one or more wireless transceivers 140 capable of transmitting one or more wireless signals all or some of which may be used for signal-based positioning. Thus, for example, as mentioned one or more wireless transceivers 140 may represent a wireless service access transceiver, a base station, a repeater, a dedicated beacon transmitting device, just to name a few examples, which have known positions. SPS signals 152 and/or wireless signals obtained via wireless communication link(s) 142 may, at times, be acquired by mobile device 104 and used to calculate its estimated location, etc.

In certain implementations, mobile device 104 may receive or acquire SPS signals 152 from SPS satellites (not shown). In some embodiments, SPS satellites may be from one GNSS, such as the GPS or Galileo satellite systems. In other embodiments, the SPS Satellites may be from multiple GNSS such as, but not limited to, GPS, Galileo, Glonass, or Beidou (Compass) satellite systems. In other embodiments, SPS satellites may be from any one several regional navigation satellite systems (RNSS') such as, for example, WAAS, EGNOS, QZSS, just to name a few examples.

In certain implementations, mobile device 104 may transmit wireless signals to, and receive wireless signals from, a wireless communication network (e.g., represented by network(s) 120). In one example, mobile device may communicate with a cellular communication network (e.g., represented by network(s) 120) by transmitting/acquiring wireless signals 122 to/from a base station transceiver or the like.

In a particular example implementation, mobile device 104 and/or computing resources (devices) 130 may communicate with each other and/or other resources (devices) 130 over network(s) 120. As mentioned, network(s) 120 may comprise any combination of wired or wireless links. In a particular implementation, network(s) 120 may comprise an Internet Protocol (IP) infrastructure and/or the like, which may be capable of facilitating communication between mobile device 104 and/or computing resources (devices) 130. In another example implementation, network(s) 120 may comprise cellular communication network infrastructure such as, for example, a base station controller or master switching center to facilitate mobile cellular communication with at least mobile device 104.

In particular implementations, and as discussed below, mobile device 104 may have circuitry and processing resources capable of computing a position fix (e.g. calculating an estimated location) of mobile device 104. For example, mobile device 104 may compute a position fix based, at least in part, on pseudorange measurements to one or more SPS satellites. Here, mobile device 104 may compute such pseudorange measurements based, at least in part, on of pseudonoise code phase detections in SPS signals 152 acquired from one or more SPS satellites. In particular implementations, mobile device 104 may receive SPS positioning assistance data that may aid in the acquisition of SPS signals 152 transmitted by SPS 150 including, for example, almanac, ephemeris data, Doppler search windows, just to name a few examples.

In other implementations, mobile device 104 may obtain a position fix by processing signals acquired from one or more cellular network transmitting devices and/or the like having known positions (e.g., such as base station transceiver, etc.) using any one of several techniques such as, for example, advanced forward trilateration (AFLT), observed time difference of arrival (OTDOA), etc. In certain example implementations, a range from mobile device 104 may be measured to a plurality of such cellular network transmitting devices, e.g., based, at least in part, on pilot signals transmitted by the cellular network transmitting devices from their known locations and acquired at mobile device 104. In certain instances, network(s) 120 and/or computing resources (devices) 130 may be capable of providing certain forms of cellular network positioning assistance data to mobile device 104, which may include, for example, locations and identities of base transceiver stations, etc., to facilitate certain positioning techniques that might use cellular network signals. For example, a base station almanac (BSA) which indicates locations and identities of cellular base stations in a particular region or regions.

In particular environments, such as indoor environment 125, mobile device 104 may not be capable of acquiring signals from a sufficient number of SPS satellites and/or from a sufficient number of cellular network transmitting devices to effectively perform the requisite processing to efficiently compute a position fix. However, mobile device 104 may be capable of computing a position fix based, at least in part, on one or more wireless signals acquired from one or more wireless transceivers 140 (e.g., WLAN service access transceivers positioned at known locations, etc.). For example, mobile device 104 may obtain a position fix by measuring ranges to one or more indoor terrestrial wireless service access transceivers which may be positioned at known locations. Such ranges may be measured, for example, by obtaining a MAC address and/or the like from signals acquired from such service access transceivers and obtaining range measurements to the service access transceivers by measuring one or more characteristics of one or more signals acquired from such service access transceivers such as, for example, received signal strength indicator (RSSI) or round trip time (RTT). In alternative implementations, mobile device 104 may obtain an indoor position fix by applying characteristics of acquired signals to a radio heatmap, probability heatmap, and/or the like or some combination thereof indicating expected RSSI and/or RTT signatures at particular locations in the indoor environment.

Terrestrial-based wireless positioning signal systems typically rely on deployment of several wireless transceivers 140 (e.g., WiFi hotspots) at fixed (known) locations to enable a mobile device to obtain range measurements to the fixed locations based, for example, on measurements of signals transmitted from the wireless transceivers as pointed out above. However, some indoor areas, e.g., such as representative indoor environment 125, may have an overly dense population of wireless transceivers, and as such, it may be beneficial to make use of just a few selected wireless transceivers.

Thus, in accordance with certain aspects of the present description, some example passive scanning operations and active probing operations are presented which may be adapted to particular situations, environments, devices, needs, etc. In one example, a passive scanning operation may be implemented in a mobile device to select certain wireless transceivers for use in positioning. In one example, passive scanning operation may be implemented in a mobile device to determine a transmit power for use in a subsequent active probing operation. In one example, an active probing operation may be implemented in a mobile device to probe selected wireless transceivers, e.g., as determined as part of a passive scanning operation. In one example, an active probing operation may be implemented in a mobile device to probe selected wireless transceivers based on an adapted transmit power, e.g., as determined as part of a passive scanning operation.

Figure 2:
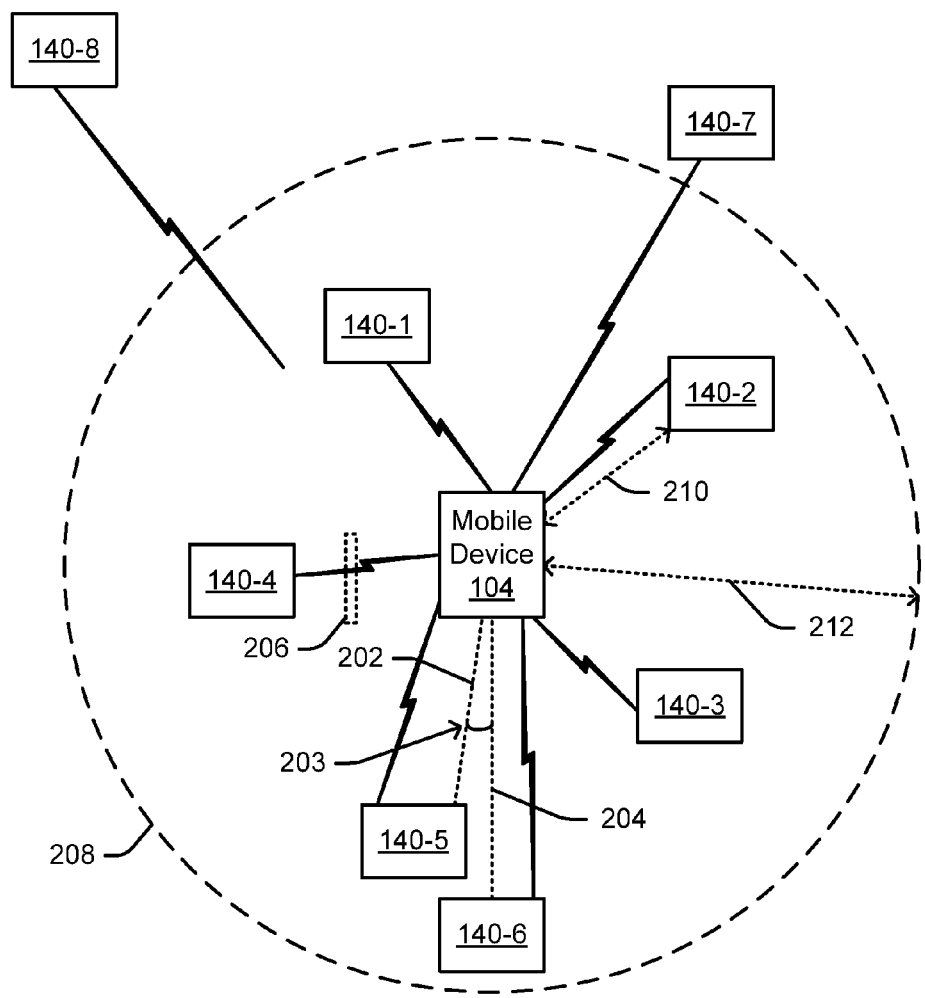
FIG. 2 is a schematic block diagram illustrating an example environment that includes a mobile device and a plurality of wireless transceivers for use in certain adaptive passive scanning and/or adaptive active probing techniques supporting mobile device positioning, in accordance with an example implementation.

With this in mind, reference is made next to FIG. 2, which is a schematic block diagram illustrating an example environment 200 that includes mobile device 104 and a plurality of wireless transceivers for use in certain adaptive passive scanning and/or adaptive active probing techniques supporting mobile device positioning, in accordance with an example implementation.

More specifically, in this example, mobile device 104 is illustrated as being arranged in an environment 200 amongst a plurality of wireless transceivers 140-1 through 140-8. In this example, it is assumed that each of the illustrated wireless transceivers shares a few traits.

The first shared trait is that a wireless transceiver may, from time to time, transmit (e.g., operating in a broadcasting or other like mode) one or more wireless signals that may be acquired by mobile device 104. By acquiring such wireless signal(s), a mobile device 104 may identify the transmitting wireless transceiver and measure a received signal strength. By way of an example, wireless transceivers 140-1 through 140-8 may each transmit one or more beacon signals and/or the like that may be properly acquired by mobile device 104 under certain conditions (e.g., the transmitted wireless signal arrives at the mobile device in a condition that allows the mobile device to recover applicable information carried by the transmitted wireless signal). In certain example implementations, the acquisition of such wireless signals may be referred to as "passive scanning" or other similar terms because mobile device 104 may receive such wireless signals without actively transmitting any particular signals. Hence, mobile device 104 may, from time to time, "passively scan" for wireless signals from one or more wireless transceivers. Such a passive scan may identify one or more nearby wireless transceivers and obtain respective received signal strength measurements.

A wireless transceiver may be identified, for example, by one or more numbers, character strings, bit strings, etc., that may be considered to be substantially unique either universally and/or within certain contexts. For example, as mentioned, certain devices may be identified based on an assigned media access control (MAC) address, etc.

A received signal strength measurement may, for example, comprise some value or other like indication that is based, at least in part on a power level of a wireless signal as acquired by mobile device 104. Such a received signal strength measurement may, for example, be based, at least in part, on a maximum magnitude, a minimum magnitude, an average magnitude, an instantaneous or otherwise sampled magnitude, and/or some other measurable power related value for an acquired wireless signal.

In certain instances, mobile device 104 may further determine a location of a wireless transceiver identified during a passive scan. For example, in certain instances, a beacon or other like signal may be indicative of a location of its wireless transceiver. For example, in certain instances, a mobile device may use other information (e.g., positioning and/or navigation assistance data, etc.) to obtain a location of an identified wireless transceiver. A location of a wireless transceiver may, for example, indicate certain applicable coordinates for the wireless transceiver with regard to a particular coordinate system.

A trait that may be shared by certain wireless transceivers may be, that under certain conditions, a probe signal transmitted by mobile device 104 at a first time may be acquired, and in response, at a later time (subsequent to the first time) a response signal may be transmitted back to mobile device 104 and which may be acquired by the mobile device at a second time. Such active exchange of signals may, for example, be performed according to a process in which the wireless transceiver ensures that a particular period of time (e.g., an expected processing period) passes from the time that the probe signal is acquired by the wireless transceiver until the response signal it transmitted. Accordingly, mobile device 104 may determine at least a round trip time (RTT) based, at least in part, by subtracting the expected processing period from the period of time between the first time and the second time. In certain implementations, other like time measurements may be determined using other known techniques. For example, if the mobile device and the wireless transceiver are synchronized or their clock offsets are known it may be possible to determine a time of flight for either a probe signal or a response signal. Moreover, a range between the respective antennas of the mobile device and the wireless transceiver may be determined based, at least in part, on the RTT or other like time measurement(s), e.g., based, at least in part, on an expected wireless signal propagation speed.

In certain example implementations, mobile device 104 may determine further identifying information (e.g., a unique identifier, a MAC address, etc.) for a wireless transceiver based, at least in part, on a passive scan. For example, in certain instances, a beacon or other like signal may be indicative of some operative characteristic of the transmitting wireless transceiver, e.g., a type of the wireless transceiver, a capability of the wireless transceiver, a network affiliation of the wireless transceiver, etc. For example, in certain instances, a mobile device may use other information (e.g., positioning and/or navigation assistance data, etc.) to obtain information relating to such operative characteristics. In certain example implementations, a wireless transceiver may be selected for subsequent active probing and/or other purposes by mobile device 104 based, at least in part, on one or more of its operative characteristics. For example, one or more wireless transceivers may be selected as part of a subset of wireless transceivers for active probing based, at least in part, on the type of device that the wireless transceiver may be part of her operatively associated with. Here, for example, it may be beneficial to select a subset of wireless transceivers that are part of a particular location based system, network, etc. Hence, for example, a subset of wireless transceivers may comprise service access transceivers and/or the like that may be operatively provided as part of a wireless local area network. In another example one or more wireless transceivers may be selected based on the one or more operative characteristics indicating that the wireless transceiver may support additional operations that may be undertaken by a mobile device. For example, a wireless transceiver may be selected as part of the subset of wireless transceivers based, at least in part, on an operative characteristic such as providing location based services, electronic maps, etc., which may be associated with a particular indoor environment. In yet another example, a wireless transceiver may be selected based at least in part on an operative characteristic identifying and/or otherwise likely indicating that it adheres to and/or otherwise satisfy certain desired security procedures, e.g., with regard to safeguarding private information, location information, and/or the like which may be associated with a mobile device and/or its user. Thus, a few examples have been provided above to illustrate that in addition to selecting a subset of wireless transceivers for active probing based, at least in part, on their received signal strengths obtain during passive scanning, in certain instances one or more of the wireless transceivers may be selected for additional reasons, such as one or more operative characteristics that may be identified.

With such shared traits in mind, as illustrated in FIG. 2, with mobile device 104 operating in a passive scan mode, wireless signals (e.g., beacon signals, etc.) may be acquired from wireless transceivers 140-1 through 140-7, but not 140-8. Here, for example, wireless transceiver 140-8 is represented as being too far away from mobile device 104 and/or as passively having its wireless signal interfered with too much to permit mobile device 104 from acquiring the wireless signal transmitted by wireless transceiver 140-8.

Thus, in this example, it will be assumed that as a result of at least one passive scan, mobile device 104 has acquired wireless signals from wireless transceivers 140-1 through 140-7. Accordingly, mobile device 104 may be capable of uniquely identifying each of wireless transceivers 140-1 through 140-7 and possibly transmitting corresponding probe signals to one or more of wireless transceivers 140-1 through 140-7. Moreover as previously described, mobile device 104 may also comprise knowledge as to the location for each of wireless transceivers 140-1 through 140-7. Further still, as previously described mobile device 104 may also comprise a received signal strength measurement for each of wireless transceivers 140-1 through 140-7.

Although not drawn to scale, FIG. 2 is intended to illustrate that there may be different ranges between mobile device 104 and each of wireless transceivers 140-1 through 140-7. For example, wireless transceivers 140-1, 140-2, 140-3, and 140-4 appear to be somewhat closer to mobile device 104 then wireless transceivers 140-5, 140-6 and 140-7. Of course it should be recognized that in certain instances, different wireless transceivers may transmit their respective wireless signals at different power levels. Additionally, should be recognized that in certain instances, wireless transceivers may have different antenna designs and/or other like arrangements, and/or coverage areas, which in addition to distance may affect a received signal strength at mobile device 104. Further, as illustrated by object 206 which affects the wireless signal from wireless transceiver 140-4, one or more objects and/or otherwise intervening materials may affect a received signal strength and/or other characteristics of the wireless signal after transmission. Nonetheless, one of the characteristics of acquired wireless signals that may be compared following a passive scanning operation are the respective received signal strength measurements. Indeed, in certain instances, it may be that the wireless signals with the relatively higher received signal strengths correspond to wireless transceivers that may be closer to mobile device 104 then other wireless transceivers. Thus, for example, a wireless signal acquired from wireless transceiver 140-1 may have a higher received signal strength measurement then it wireless signal acquired from wireless transceiver 140-7 do, at least in part to wireless transceiver 140-1 being much closer to mobile device 104 then wireless transceiver 140-7.

As illustrated, by a the dashed line 210, a range between mobile device 104 and wireless transceiver 140-2 may be determined based, at least in part, on a round trip time and/or other like a propagation timing measurement that may be observed and measured during an active probing operation.

As described in greater detail herein, mobile device 104 may determine a transmission power for use in the transmitting a probe signal to a subset of wireless transceivers based, at least in part, on at least one of the received signal strengths measured as part of the passive scan operation. With this in mind, in transmitting a particular probe signal to a particular wireless transceiver, mobile device 104 may exhibit a particular coverage area that may be based, at least in part, the determined transmission power. Thus, for example, FIG. 2 includes a coverage area 208 which, in this example extends outwardly in an omni directional manner from an antenna(s) of mobile device 104 with an example radius 212. It should be understood that this is just a simplified drawing and then to an actual coverage area may be much more complex. Further, it should be understood that different wireless transceivers may be more or less sensitive in acquiring wireless signals from mobile device 104. Further still, it should be understood that race objects and/or other materials may be arranged between a mobile device 104 and a wireless transceiver, which may affect the transmitted signal in some manner.

However, even with this in mind, in accordance with certain implementations, it may be beneficial to determine a transmission power for use in transmitting one or more probe signals to one or more wireless transceivers based, at least in part, on at least one of the received signal strengths measured as part of the passive scan operation. For example, in certain implementations, a subset of wireless transceivers may be selected based, at least in part, on their respective received signal strengths measured during a passive scan. The number of wireless transceivers in a subset may, for example, vary depending upon various factors, including, for example, a desired level of accuracy in determining an estimated location of the mobile device, a number of probe signals that may need to be transmitted, one or more processing resource considerations, a power usage consideration, etc. In certain example implementations, one or more threshold values may be predetermined and/or dynamically determined based on one or more of these and/or other like considerations.

Indeed, by way of one example, a desired number of wireless transceivers to be included in a subset of wireless transceivers, and/or the inclusion or exclusion of one or more particular wireless transceivers with regard to such a subset of wireless transceivers may be determined based, at least in part, on a dilution of precision (DOP) and/or the like. Thus, for example, consider the illustrated locations of wireless transceivers 140-5 and 140-6 with regard to mobile device 104. As illustrated there is a slight offset illustrated by an angle 203 between a directional line 202 from mobile device 104 to wireless transceiver 140-5 and another directional line 204 from mobile device 104 to wireless transceiver 140-6. Here, in this example, it may be assumed that the angle 203 may represent several degrees, or perhaps a fraction of one degree, and/or in certain instances zero degrees 0°). Hence, in certain instances wireless transceivers 140-5 and 140-6 may be located in about the same direction with the same or different distances, or may be located at different distances along the same line extending from mobile device 104. Accordingly, it may be less useful to use wireless transceivers 140-5 and 140-6 for positioning and/or other like navigation functions since their locations may not be as angularly separated as might other wireless transceivers. Hence for example, a desired DOP may not be met by a subset of wireless transceivers having too few numbers of wireless transceivers and/or too few wireless transceivers having at least a threshold level of angular separation. Thus, in certain example implementations it may be beneficial to of wireless transceivers 140-5 or 140-6 for inclusion in a subset of wireless transceivers, e.g., and assuming there are enough other available wireless transceivers for selection.

As described herein, by actively probing each of the wireless transceivers in such a subset of wireless transceivers in determining a round trip time and/or other like propagation timing measurements, ranges may be calculated between mobile device 104 and each of the actively probe wireless transceivers. With this in mind, in certain example implementations, a subset of wireless transceivers may comprise two or more wireless transceivers. In certain instances, an estimated location of a mobile device may be improved by increasing the number of wireless transceivers included in a subset of wireless transceivers, and hence the number of ranges available. Thus, for example, in certain implementations a rough estimate of a location of a mobile device may be obtained using two different ranges, and a more accurate location may be obtained using three different ranges, and an even more accurate location may be obtained using four or more different ranges.

Hence, it may be useful to balance the number of wireless transceivers to be actively probe based on a desired accuracy of an estimated location of the mobile device. In accordance with certain aspects, a subset of wireless transceivers may be determined based, at least in part, selecting wireless transceivers whose received signal strength measurements are less than or equal to a selected received signal strength measurement used to determine a transmission power for use in subsequently transmitting probe signals. For example, in certain implementations, a plurality of wireless transceivers identified during a passive scan operation may be (at least logically) ordered based on their received signal strength measurements, e.g., in a descending order from a highest received signal strength measurement to a lowest received signal strength measurement. Hence, for example, if K represents a threshold number of wireless transceivers to be used in estimating a location of a mobile device, then and a top-K number of wireless transceivers may be selected from such an ordered set starting from the wireless transceiver having highest received signal strength measurement.

By way of example, let us assume that the received signal strength measurements in TABLE 1 below were obtained by mobile device 104:

TABLE 1

| Wireless Transceiver (see FIG. 2) | Received Signal Strength Measurement (relative nominal values) |
| --- | --- |
| 140-1 | 1.00 |
| 140-2 | 0.92 |
| 140-3 | 0.83 |
| 140-4 | 0.51 |
| 140-5 | 0.74 |
| 140-6 | 0.63 |
| 140-7 | 0.46 |

Although the received signal strength measurements are illustrated herein using relative nominal values for simplification purposes, it should be understood that in certain example implementations, a received signal strength measurement may represent a particular unit of measurement, and/or that such units of measurement may apply to a scale that linear, logarithmic, etc.

With this in mind, as can be seen, if K equals 2 then a subset of wireless transceivers may comprise wireless transceivers 140-1 and 140-2. Moreover, a transmit power for subsequent active probing may be determined based, at least in part, on the lowest received signal strength from the subset, which in this instance would be 0.92 four wireless transceiver 140-2. In another example, if K equals 3 then a subset of wireless transceivers may comprise wireless transceivers 140-1, 140-2 and 140-3; and/or a transmit power for subsequent active probing may be determined based, at least in part, on the lowest received signal strength from such a subset, which in this instance would be 0.83 for wireless transceiver 140-3. In yet another example, if K equals 4 then a subset of wireless transceivers may comprise wireless transceivers 140-1, 140-2, 140-3, and 140-5; and/or a transmit power for subsequent active probing may be determined based, at least in part, on the lowest received signal strength from such a subset, which in this instance would be 0.74 for wireless transceiver 140-5.

As mentioned, in certain instances a subset of wireless transceivers may be further intelligently selected based on various operating characteristics that may be identified and/or taking into account certain angular separations. Thus, for example, let us assume that there may be a preference based, least in part, on one or more operative characteristics to not use wireless transceivers 140-3 or 140-4. For example, wireless transceivers 140-3 and 140-4 may not have trustworthy location information, may not support or otherwise properly adhere to certain probing and/or security agreements, etc., and, if possible, mobile device 104 may seek to use other wireless transceivers. As such, if K equals 3 then a subset of wireless transceivers (that avoids wireless transceivers 140-3 and 140-4) may comprise wireless transceivers 140-1, 140-2 and 140-5; and/or a transmit power for subsequent active probing may be determined based, at least in part, on the lowest received signal strength measurement from such a subset, which in this instance would be 0.74 for wireless transceiver 140-5. Similarly, if K equals 4 then a subset of wireless transceivers (that avoids wireless transceivers 140-3 and 140-4) may comprise wireless transceivers 140-1, 140-2, 140-5 and 140-6; and/or a transmit power for subsequent active probing may be determined based, at least in part, on the lowest received signal strength from such a subset, which in this instance would be 0.63 for wireless transceiver 140-6. However, as previously mentioned, in certain instances an angular separation between wireless transceivers 140-5 and 140-6 may not meet an angular separation threshold. Thus, in certain instances, if K equals 4 then a subset of wireless transceivers (that avoids wireless transceivers 140-3 and 140-4, and takes into consideration an angular separation threshold) may comprise wireless transceivers 140-1, 140-2, 140-5 or 140-6, and 140-7; and/or a transmit power for subsequent active probing may be determined based, at least in part, on the lowest received signal strength from such a subset, which in this instance would be 0.46 for wireless transceiver 140-6.

As may be appreciated, power usage by mobile device 104 may be reduced at times by subsequently using a transmit power that may be intelligently determined based, at least in part, on a lowest or minimum received signal strength measurement for the wireless transceivers within a particular subset of wireless transceivers to be actively probed. Those skilled in the art will understand that various functions and/or other like algorithms may be implemented to determine a transmit power based, at least in part, on a received signal strength measurement obtained during a passive scan operation.

By way of a further example, in certain implementations a transmit power for the mobile device may be selected which is proportional with regard to its operative scale based, at least in part, on how proportional a received signal strength measurement is to its own operative scale (e.g., an expected range of signal strengths from such wireless transceiver). In other words, for example, if a received signal strength measurement appears to represent about 60% of an expected range of signal strengths for a given wireless transceiver, in certain instances a transmit power for the mobile device may be adapted to represent about 60% of a range of available transmit powers. In certain example implementations, a received signal strength measurement and a transmit power a share a common unit of measure and/or possibly even a similar scale.

Figure 3:
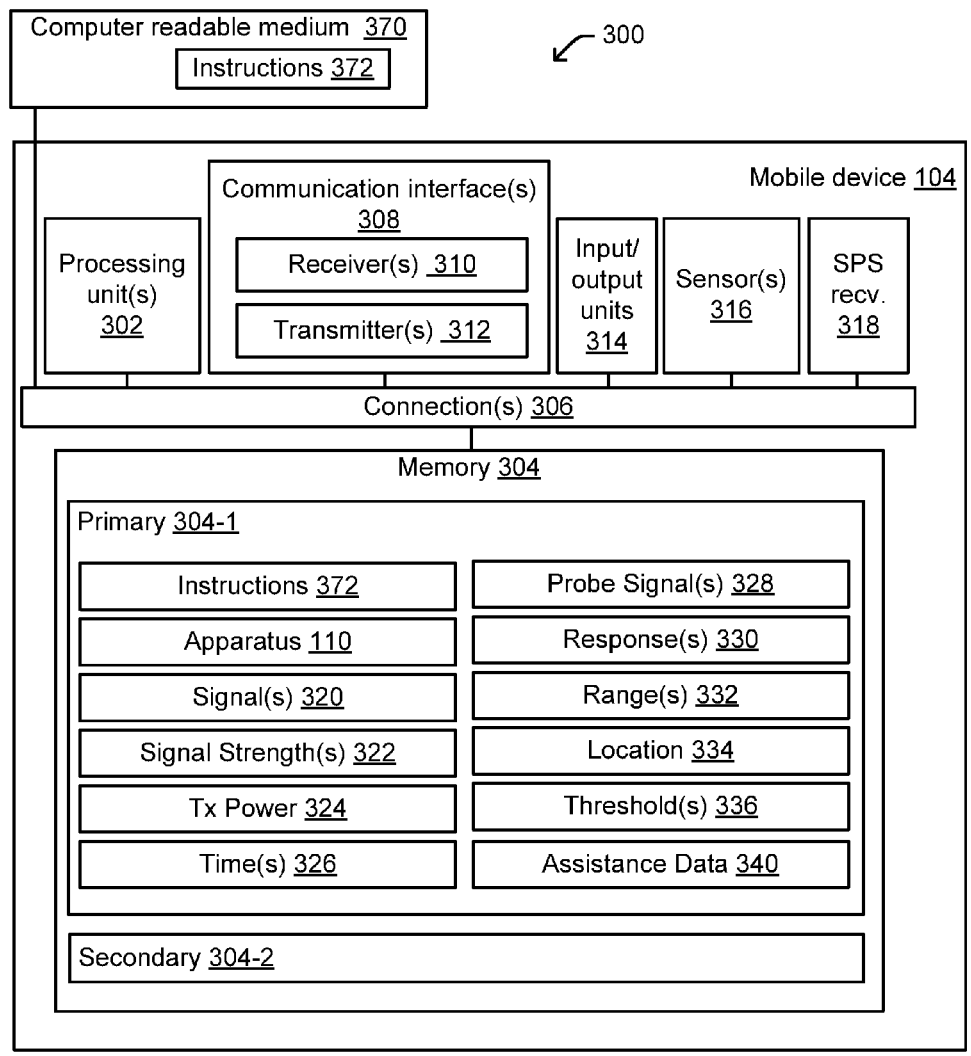
FIG. 3 is a schematic block diagram illustrating certain features of a computing platform that may be provided in a mobile device, to perform adaptive passive scanning and/or adaptive active probing in support of mobile device positioning, in accordance with an example implementation.

Reference is made next to FIG. 3, which is a schematic block diagram illustrating certain features of a computing platform 300 that may be provided in mobile device 104, to perform adaptive passive scanning and/or adaptive active probing in support of mobile device positioning, in accordance with an example implementation.

As illustrated computing platform 300 may comprise one or more processing units 302 to perform data processing (e.g., in accordance with the techniques provided herein, and/or apparatus 110, etc.) coupled to memory 304 via one or more connections 306. Processing unit(s) 302 may, for example, be implemented in hardware or a combination of hardware and software. Processing unit(s) 302 may be representative of one or more circuits configurable to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, or the like, or any combination thereof.

Memory 304 may be representative of any data storage mechanism. Memory 304 may include, for example, a primary memory 304-1 and/or a secondary memory 304-2. Primary memory 304-1 may comprise, for example, a random access memory, read only memory, etc. While illustrated in this example as being separate from the processing units, it should be understood that all or part of a primary memory may be provided within or otherwise co-located/coupled with processing unit(s) 302, or other like circuitry within mobile device 104. Secondary memory 304-2 may comprise, for example, the same or similar type of memory as primary memory and/or one or more data storage devices or systems, such as, for example, a disk drive, an optical disc drive, a tape drive, a solid motion state memory drive, etc In certain implementations, secondary memory may be operatively receptive of, or otherwise configurable to couple to, a non-transitory computer readable medium 370. Memory 304 and/or non-transitory computer readable medium 370 may comprise instructions 372 for use in performing data processing, e.g., in accordance with the techniques and/or example apparatus 110 (FIG. 1) and/or all or part of one or more example process 400 (FIG. 4), as provided herein.

Computing platform 300 may, for example, further comprise one or more communication interface(s) 308. Communication interface(s) 308 may, for example, comprise one or more radios, represented here by one or more receivers 310 and one or more transmitters 312. It should be understood that in certain implementations, communication interface 308 may comprise one or more transceivers, and/or the like. Further, it should be understood that although not shown, communication interface 308 may comprise one or more antennas and/or other circuitry as may be applicable given the radios function/capability.

By way of further example, communication interface(s) 308 may, for example, provide connectivity to network(s) 120, one or more wireless transceivers 140, and/or one or more computing resources (devices) 130 (FIG. 1), e.g., via one or more wired and/or wireless communication links. Communication interface(s) 308 may implement one or more communication protocols as may be required to support one or more wired and/or wireless communication links.

In certain example instances, mobile device 104 may comprise an SPS receiver 318 capable of acquiring and processing SPS signals 152 in support of one or more signal-based positioning capabilities.

In accordance with certain example implementations, communication interface(s) 308, one or more wireless transceivers 140, and/or computing resources in network(s) 120 may, for example, be enabled for use with various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example. Wireless communication networks may include so-called next generation technologies (e.g., "4G"), such as, for example, Long Term Evolution (LTE), Advanced LTE, WiMAX, Ultra Mobile Broadband (UMB), and/or the like. Additionally, communication interface(s) 208 and/or communication interface(s) 308 may further provide for infrared-based communications with one or more other devices. A WLAN may, for example, comprise an IEEE 802.11x network, and a WPAN may comprise a Bluetooth network, an IEEE 802.15x, for example. Wireless communication implementations described herein may also be used in connection with any combination of WWAN, WLAN or WPAN. In another aspect, a wireless transmitting device may comprise a femtocell, utilized to extend cellular telephone service into a business or home. In such an implementation, one or more mobile devices may communicate with a femtocell via a CDMA cellular communication protocol, for example, and the femtocell may provide the mobile device access to a larger cellular telecommunication network by way of another broadband network such as the Internet.

Mobile device 104 may, for example, further comprise one or more input/output units 314. Input/output units 314 may represent one or more devices or other like mechanisms that may be used to obtain inputs from and/or provide outputs to one or more other devices and/or a user of mobile device 104. Thus, for example, input/output units 314 may comprise various buttons, switches, a touch pad, a trackball, a joystick, a touch screen, a microphone, a camera, and/or the like, which may be used to receive one or more user inputs. In certain instances, input/output units 314 may comprise various devices that may be used in producing a visual output, an audible output, and/or a tactile output for a user. For example, input/output units 314 may be used to present a solicitation to the user and to obtain certain corresponding user inputs.

Mobile device 104 may, for example, comprise one or more sensors 316. For example, sensor(s) 316 may represent one or more inertial sensors, one or more environmental sensors, etc., which may be useful in detecting aspects of the environment 100 and/or mobile device 104. Thus for example, sensor(s) 316 may comprise one or more accelerometers, one or one or more gyroscopes or gyrometers, one or more magnetometers and/or the like, one or more barometers, one or more thermometers, etc. Further, in certain instances sensor(s) 316 may comprise one or more input devices such as a microphone, a camera, a light sensor, etc.

In certain example implementations, one or more sensors 316 may be used to detect and/or otherwise trigger an event which may initiate one or more operations, such as, for example, a passive scanning operation, an active probing operation, etc., e.g., as part of a positioning and/or other like navigation capability. Here, for example, the presence and/or absence of certain signals from one or more inertial sensors may be indicative of a presence or absence of movements of mobile device 104. Thus, for example, it may be beneficial at certain times to initiate or otherwise affect a passive scanning operation and/or an active probing operation in response to certain detected movements of mobile device 104.

Processing unit(s) 302 and/or instructions 372 may, for example, provide or otherwise make use of one or more signals that may be stored in memory 304 from time to time and which may represent data and/or instructions, such as: instructions 372; apparatus 110; one or more wireless signals 320; one or more received signal strength measurements 322; a transmit power 324; one or more times 326 (e.g., a first-time corresponding to transmitting a probe signal, a second time corresponding to acquiring a response signal, certain time periods, timestamps, local time, universal time, a time offset, etc.); one or more probe signals 328; one or more responses 330 (e.g., acquired from one or more wireless transceivers in response to one or more probe signals 328); one or more ranges 332 (e.g., between an antenna of the mobile device and an antenna of a wireless transceiver); one or more locations 334 (e.g., coordinates for one or more estimated locations of the mobile device, coordinates for known locations of one or more wireless transceivers, etc.); one or more threshold values 336; assistance data 340 (e.g., positioning assistance data, navigation assistance data, etc.); and/or the like or some combination thereof. It should be kept in line, that in certain example implementations, some types of data may comprise or otherwise be represented at least in part by one or more functions and/or other like computer implementable instructions, e.g., which may be used to calculate certain data values, etc. Additionally, while some the example data and/or instructions as illustrated in FIG. 3 share the same reference numbers as example data and/or instructions as illustrated in FIG. 2, it should be kept in mind that in certain instances all or part of such example data and/or instructions may be distinctly different.

SPS receiver 318 may be capable of acquiring and acquiring SPS signals 152 via one or more antennas (not shown). SPS receiver 318 may also process, in whole or in part, acquired SPS signals 152 for estimating a position or location of mobile device 104. In certain instances, SPS receiver 318 may comprise one or more processing unit(s) (not shown), e.g., one or more general purpose processors, one or more digital signal processors DSP(s), one or more specialized processors that may also be utilized to process acquired SPS signals, in whole or in part, and/or calculate an estimated location of mobile device 104. In certain implementations, all or part of such processing of acquired SPS signals may be performed by other processing capabilities in mobile device 104, e.g., processing unit(s) 302, memory 304, etc., in conjunction with SPS receiver 318. Storage of SPS or other signals for use in performing positioning operations may be performed in memory 304 or registers (not shown).

Sensors 316 may generate analog or digital signals that may be stored in memory 304 and processed by DPS(s) (not shown) or processing unit(s) 302 in support of one or more applications such as, for example, applications directed to positioning or navigation operations.

Processing unit(s) 302 may comprise a dedicated modem processor or the like that may be capable of performing baseband processing of signals acquired and downconverted at receiver(s) 310 of communication interface(s) 308 or SPS receiver 318. Similarly, a modem processor or the like may perform baseband processing of signals to be upconverted for transmission by wireless transmitter(s) 312. In alternative implementations, instead of having a dedicated modem processor, baseband processing may be performed by a general purpose processor or DSP (e.g., general purpose/application processor). It should be understood, however, that these are merely examples of structures that may perform baseband processing, and that claimed subject matter is not limited in this respect.

Figure 4:
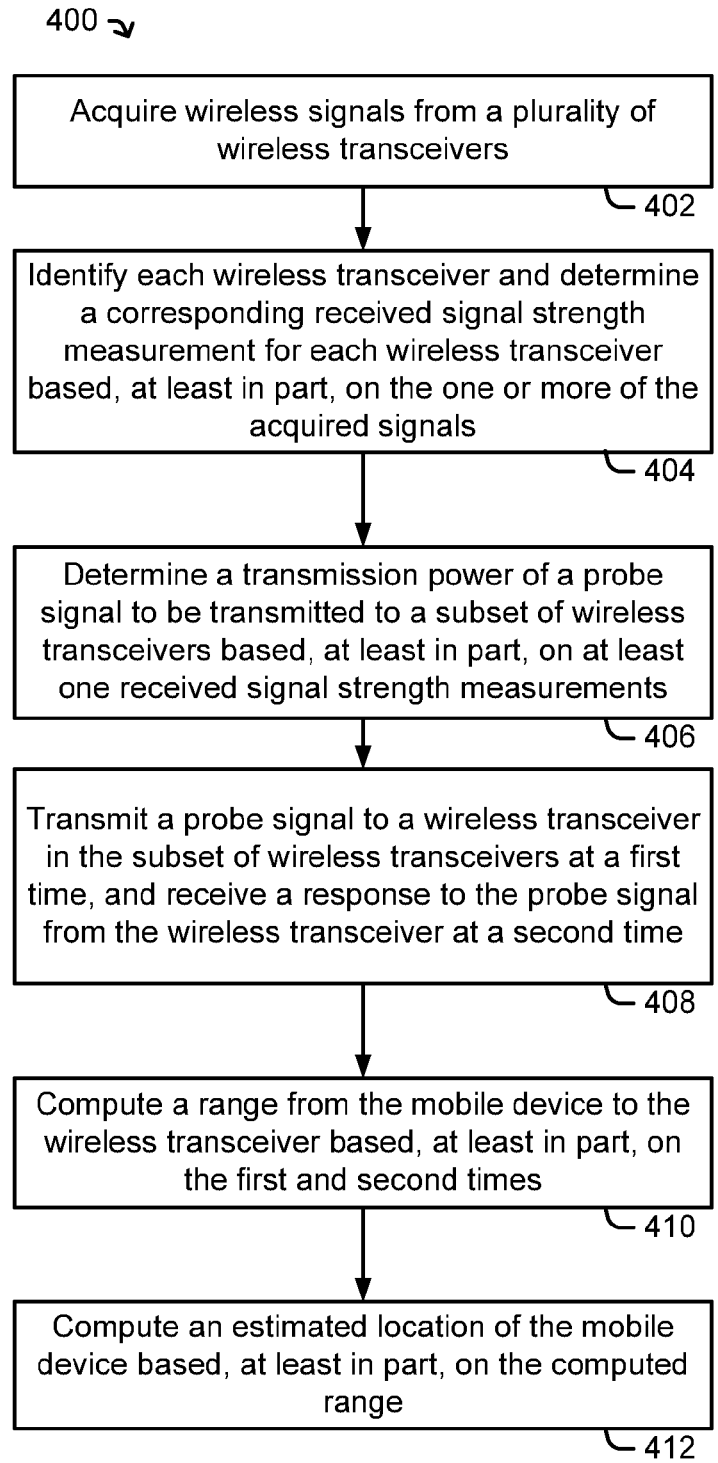
FIG. 4 is a flow diagram illustrating an example process that may be implemented in a mobile device, to perform adaptive passive scanning and/or adaptive active probing in support of mobile device positioning, in accordance with an example implementation.

Reference is made next to FIG. 4, which is a flow diagram illustrating an example process 400 that may be implemented in mobile device 104 and/or apparatus 110 (FIG. 1), to perform adaptive passive scanning and/or adaptive active probing in support of mobile device positioning, in accordance with an example implementation At example block 402, one or more wireless signals may be acquired by a wireless device from one or more wireless transceivers. As previously mentioned, in certain instances, a wireless device may perform passive scanning operation in which one or more wireless signals may be acquired from one or more wireless transceivers. In certain example implementations, one wireless signal may comprise a Beacon signal and/or other like wireless signal that may be broadcast by the wireless transceiver from time to time. By way of one example, a wireless transceiver may take the form of a service access transceiver and/or the like, which may be provided as part of a wireless local area network and/or some other communication network(s). Such a service access transceiver may, for example, broadcast one or more messages which identify certain aspects about the service access transceiver to other devices that may be within the coverage area of the service access transceiver, such as a mobile device. As previously mentioned, and as well known, such Beacon signals and/or other like wireless signals may comprise and/or otherwise identifying some manner the transmitting device. Thus, for example, a service access transceiver and/or other like wireless transceiver may transmit its assigned unique identifier, such as a MAC address, a service set identifier (SSID), a uniform resource locator (URL), etc. Additionally, in certain implementations, certain wireless signals may also provide additional information about the wireless transceiver. For example, certain wireless signals may identify coordinates for a location of the wireless transceiver. For example, certain wireless signals may identify certain operative characteristics of the wireless transceiver.

At example block 404, a mobile device may identify a particular wireless transceiver is having transmitted wireless signal has acquired at block 402. At block 404, mobile device may further determine a corresponding received signal strength measurement for one or more wireless signals acquired at block 402. As mentioned, a received signal strength measurement may take on various forms, units, scales, etc., e.g., depending upon the underlying design and/or use thereof within the mobile device. In certain example implementations, a received signal strength measurement may comprise a received signal strength indication (RSSI), and/or the like, associated with the measurement of the power present in the acquired radio signal.

At example block 406, the mobile device may determine a transmission power of one or more probe signals to be transmitted to one or more wireless transceivers in a subset of wireless transceivers. Here, for example, a transmission power may be based, at least in part, on at least one received signal strength measurement. Thus, for example, as part of block 406, a subset of wireless transceivers may be determined based, at least in part, on at least one of the received signal strength measurements. Additionally, as previously mentioned, certain wireless transceivers may be selected for such a subset of wireless transceivers based on one or more threshold values. For example, one threshold value may specify a subset of wireless transceivers is to comprise a particular number of wireless transceivers, and/or at least a minimum number of wireless transceivers. For example, one threshold may specify that certain wireless transceivers may be selected over other wireless transceivers for various reasons, including, for example, certain operable characteristics of one or more of the wireless transceivers, an angular separation between certain wireless transceivers, etc.

At example block 408, as part of an example active probing operation, a mobile device may transmit a probe signal (e.g., one or more messages) to a particular wireless transceiver within the subset of wireless transceivers from block 406. Indeed, as part of example block 408, a mobile device may transmit an applicable probe signal to each of the wireless transceivers within the subset of wireless transceivers. Thus, for example, if there are four wireless transceivers within a subset of wireless transceivers, then at example block 408, a mobile device may transmit for separate probe signals, e.g., one probe signal for each wireless transceiver. The probe signals may be transmitted by the mobile device using the transmission power as determined at example block 406. For a given probe signal and a given wireless transceiver, the mobile device may transmit the probe signal at a first time, and receive a response signal (e.g., one or more messages) to such a probe signal from the applicable wireless transceiver at a second time that is subsequent to the first time. Hence, for example, a round trip time associated with such active probing operation may be determined by subtracting a known processing period consumed by the wireless transceiver from the period of time between the first time and the second time. Here, such a round trip time may represent at least the combined propagation time for the probe signal to travel from the antenna of the mobile device to the antenna of the wireless transceiver, and the propagation time for the response signal to travel from the antenna of the wireless transceiver to the antenna of the mobile device. In accordance with certain example implementations, such an active probing operation may comprise the use of a request to send (RTS) (e.g., as a probe signal) and clear to send (CTS) (e.g., as a response signal) signaling/messaging techniques as provided by IEEE 802.11 networking protocols, and/or the like.

At example block 410, a range from the mobile device to a wireless transceiver may be computed based, at least in part, on the first and second times. Here, for example, a point-to-point range between the mobile device and such wireless transceiver may be determined based on an assumed speed of the propagating signal. Such ranging techniques and like others are well known.

At example block 412, an estimated location of the mobile device may be computed based, at least in part, on one or more of the ranges computed at block 410. Here, for example, trilateration and/or other positioning/navigation techniques may be implemented based on the ranges to and known locations of the wireless transceivers in the subset of wireless transceivers previously selected. Such location estimation techniques and like others are also well known. As part of block 412, in certain implementations, an estimated location of the mobile device may be presented and/or otherwise indicated to a user of the mobile device, and/or shared with one or more other functions and/or processes performed in a poor part on board the mobile device, and/or at one or more other computing resources (devices). For example, in certain implementations, an estimated location may be provided to a location based service entity, emergency responder, another mobile device, etc.

Example process 400, or particular portions thereof, may be repeated from time to time, e.g., in response to a scheduled event, an occurrence of some detectable event, a user input, an acquired wireless signal, etc. As previously mentioned, all or part of example blocks 402, 404 and 406 may be performed as part of a passive scanning operation performed by the mobile device, and/or all or part of example blocks 408, 410 and 412 may be performed as part of an active probing operation performed by the mobile device. In certain instances, a plurality of passive scanning operations may occur prior to an active probing operation, and/or in between two active probing operations. Conversely, in certain instances, two or more active probing operations may be performed without any intervening passive scanning operations. Furthermore, as mentioned, in certain instances, a passive scanning operation and/or an active probing operation may be affected in some manner in response to certain events and/or the like.

As presented by the example implementations described herein, a mobile device may perform a passive scanning operation for wireless signals from wireless transceivers. In performing an example passive scanning operation, a mobile device may acquire one or more signals transmitted by a wireless transceiver and determine at least an identity of the wireless transceiver (e.g., a MAC address, etc.), and measure a received signal strength. Given limited transmission power at a mobile device (e.g., to extend battery charge life), a mobile device may transmit signals applying a lower transmission power than applied at a fixed wireless transceiver for transmitting similar signals. As such, a transmission range or applicable coverage area of a wireless transceiver positioned at a fixed location is typically greater than that of a mobile device.

In certain example implementations, it may be presumed that, at least for short durations time, conditions in a signal path between a wireless transceiver and a mobile device affecting attenuation of a passively scanned wireless signal acquired at the mobile device (e.g., range, physical obstructions, etc.) similarly affect attenuation of a probe signal that may be subsequently transmitted from the mobile device to the transceiver. In attempting to measure ranges to transceivers based on round trip times, a mobile device may tailor the transmission power of a probe packet to be transmitted to transceivers detected/identified in a passive scan based, at least in part, on a signal strength measured from the passive scan. This may, for example, allow a mobile device to conserve battery life by transmitting one or more probe signals to one or more wireless transceivers at less than a full transmission power while still providing a sufficient signal strength to allow acquisition of the probe packet by the most distant wireless transceivers being probed (e.g., those identified in a subset of wireless transceivers).

Thus, in certain example implementations, a transmission power for a probe signal may be based, at least in part, on a received signal strength measurement of a wireless signal acquired in a passive scanning operation. In one particular example, a transmission power for a probe signal may be determined based, at least in part, on a lowest or minimum received signal strength measurement of wireless signals acquired in the passive scanning operation from among wireless transceivers within the subset of wireless transceivers to be probed. In other words, the transmission strength for a probe signal being transmitted to a wireless transceiver associated with the signal path with the most attenuation (e.g., at the longest range, most interfering objects, etc.) may be sufficient to allow that wireless transceiver to acquire the probe signal, without wastefully transmitting such a probe signal at a higher transmission power. Moreover, the same transmission power setting may be used for transmitting other probe signals to other wireless transceivers identified in the subset of wireless transceivers to be probed.

In certain example implementations, a mobile device may not transmit a probe packet to all wireless transceivers detected/identified in a passive scan. Here, for example as previously mentioned, a mobile device may select (e.g., three, four or five, depending on desired position fix accuracy, for example) from several wireless transceivers detected/identified in a passive scan. In one example, a mobile device may select from among the detected/identified wireless transceivers transmitting wireless signals having the highest received signal strength measurements in a passive scan. In certain instances, a mobile device may select a subset of wireless transceivers transmitting signals having a received signal strength that is acceptable, and adequate (threshold) angular separation from one another (e.g., as determined from the vantage point of a rough estimate of location of the mobile device). In certain example implementations, as mentioned, one or more wireless transceivers may be selected so as to provide a low or minimum dilution of precision in a location estimate to be computed by calculated ranges to the selected wireless transceivers.

The methodologies described herein may be implemented by various means depending upon applications according to particular features and/or examples. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels. Unless specifically motion stated otherwise, as apparent from the following discussion, it is appreciated that throughout this specification discussions utilizing terms such as "processing," "computing," "calculating," "determining", "establishing", "obtaining", "identifying", "applying," and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method comprising:
    performing, at a mobile device, at least one passive scan operation by measuring signal strength of signals from a plurality of wireless transceivers;
    determining a threshold number of said plurality of wireless transceivers capable of estimating a location of said mobile device; and
    determining an order of a subset of wireless transceivers of said threshold number of said plurality of wireless transceivers based, at least in part, on one or more of said measured signal strength and one or more operating characteristics of said threshold number of said plurality of wireless transceivers.

2. The method of claim 1, and further comprising determining a transmit power for performing at least one active probing operation based, at least in part, on said order of said subset of wireless transceivers.

3. The method of claim 2, wherein said determining said transmit power is further based, at least in part, on a lowest received signal strength measurement for said subset of wireless transceivers.

4. The method of claim 1, wherein said order of said subset of wireless transceivers comprises a descending order from a highest received signal strength measurement to a lowest received signal strength measurement.

5. The method of claim 1, wherein said one or more operating characteristics comprise at least one of the following: trustworthiness of location information; adherence to a probing agreement; adherence to a security agreement; an angular separation threshold; wireless transceiver type; wireless transceiver capability; wireless transceiver network affiliation; or any combination thereof.

6. The method of claim 1, and further comprising determining a range from said mobile device to said subset of wireless transceivers based, at least in part, on at least one of the following: a measured round trip time (RTT); a measured time of flight for a probe signal; a measured time of flight for a response signal; or any combination thereof.

7. The method of claim 6, wherein said range is determined via performing at least one active probing operation with respect to said order of said subset of wireless transceivers.

8. The method of claim 7, wherein said at least one active probing operation is performed in accordance with a request-to-send/clear-to-send (RTS/CTS) networking protocol.

9. The method of claim 6, and further comprising estimating said location of said mobile device based, at least in part, on said determined range.

10. The method of claim 1, wherein said plurality of wireless transceivers comprises a plurality of known wireless transceivers positioned at fixed locations.

11. The method of claim 10, wherein said plurality of known wireless transceivers positioned at fixed locations comprises a plurality of IEEE 802.11 std. Wi-Fi access points.

12. The method of claim 1, wherein said signal strength is measured via one or more beacon signals acquired from said plurality of wireless transceivers.

13. The method of claim 12, wherein said one or more beacon signals comprise identifying information for said plurality of wireless transceivers.

14. The method of claim 13, wherein said identifying information comprises at least one of the following: a media access control (MAC) address; a service set identifier (SSID); a uniform resource locator (URL); a unique identifier; or any combination thereof.

15. An apparatus for use in a mobile device, the apparatus comprising:
    means for performing at least one passive scan operation by measuring signal strength of signals from a plurality of wireless transceivers;
    means for determining a threshold number of said plurality of wireless transceivers capable of estimating a location of said mobile device; and
    means for determining an order of a subset of wireless transceivers of said threshold number of said plurality of wireless transceivers based, at least in part, on one or more of said measured signal strength and one or more operating characteristics of said threshold number of said plurality of wireless transceivers.

16. The apparatus as recited in claim 15, and further comprising means for determining a transmit power for performing at least one active probing operation based, at least in part, on said order of said subset of wireless transceivers.

17. The apparatus as recited in claim 16, wherein said means for determining said transmit power further comprise means for determining said power based, at least in part, on a lowest received signal strength measurement for said subset of wireless transceivers.

18. The apparatus as recited in claim 15, wherein said one or more operating characteristics comprise at least one of the following: trustworthiness of location information; adherence to a probing agreement; adherence to a security agreement; an angular separation threshold; wireless transceiver type; wireless transceiver capability; wireless transceiver network affiliation; or any combination thereof.

19. The apparatus as recited in claim 15, and further comprising means for determining a range from said mobile device to said subset of wireless transceivers based, at least in part, on at least one of the following: a measured round trip time (RTT); a measured time of flight for a probe signal; a measured time of flight for a response signal; or any combination thereof.

20. The apparatus as recited in claim 19, wherein said means for determining said range further comprise means for determining said range via performing at least one active probing operation with respect to said order of said subset of wireless transceivers.

21. The apparatus as recited in claim 15, wherein said means for performing at least one passive scan operation by measuring said signal strength from said plurality of wireless transceivers is comprised of means for measuring said signal strength via one or more beacon signals acquired from said plurality of wireless transceivers.

22. The apparatus as recited in claim 21, wherein said one or more beacon signals comprise identifying information for said plurality of wireless transceivers, wherein said identifying information comprises at least one of the following: a media access control (MAC) address; a service set identifier (SSID); a uniform resource locator (URL); a unique identifier; or any combination thereof.

23. A mobile device comprising:
a wireless transceiver to:
    perform at least one passive scan operation by measuring signal strength of signals from a plurality of wireless transceivers;
a processing unit to:
    determine a threshold number of said plurality of wireless transceivers capable of estimating a location of said mobile device; and
    determine an order of a subset of wireless transceivers of said threshold number of said plurality of wireless transceivers based, at least in part, on one or more of said measured signal strength and one or more operating characteristics of said threshold number of said plurality of wireless transceivers.

24. The mobile device as recited in claim 23, wherein said processing unit is further configured to determine a transmit power for performing at least one active probing operation based, at least in part, on said order of said subset of wireless transceivers.

25. The mobile device as recited in claim 24, wherein said processing unit is further configured to determine said transmit power based, at least in part, on a lowest received signal strength measurement for said subset of wireless transceivers.

26. The mobile device as recited in claim 23, wherein said one or more operating characteristics comprise at least one of the following: trustworthiness of location information; adherence to a probing agreement; adherence to a security agreement; an angular separation threshold; wireless transceiver type; wireless transceiver capability; wireless transceiver network affiliation; or any combination thereof.

27. The mobile device as recited in claim 23, wherein said processing unit is further configured to determine a range from said mobile device to said subset of wireless transceivers based, at least in part, on at least one of the following: a measured round trip time (RTT); a measured time of flight for a probe signal; a measured time of flight for a response signal; or any combination thereof.

28. The mobile device as recited in claim 27, wherein said processing unit is further configured to determine said range via performing at least one active probing operation with respect to said order of said subset of wireless transceivers.

29. A non-transitory computer readable medium having computer implementable code stored therein, that are executable by a processing unit in a mobile device, comprising:
    code to perform at least one passive scan operation by measuring signal strength of signals from a plurality of wireless transceivers;
    code to determine a threshold number of said plurality of wireless transceivers capable of estimating a location of said mobile device; and
    code to determine an order of a subset of wireless transceivers of said threshold number of said plurality of wireless transceivers based, at least in part, on one or more of said measured signal strength and one or more operating characteristics of said threshold number of said plurality of wireless transceivers.

30. The computer readable medium as recited in claim 29, said computer implementable code further comprising code to determine a transmit power for performing at least one active probing operation based, at least in part, on said order of said subset of wireless transceivers.

* * * * *